Patented Feb. 4, 1930

1,745,607

UNITED STATES PATENT OFFICE

FERDINAND D'ESPOSITO, OF BROOKLYN, NEW YORK

COMPOSITE GEM

No Drawing.    Application filed February 28, 1928.    Serial No. 257,781.

This invention relates to jewelry and particularly to the process of making improved composite gems and the product thereof.

A special object of my invention is to provide a composite gem, and the novel materials for making the same, that will simulate in every important respect the more precious colored minerals such as emeralds, rubies and the like.

Composite gems are composed of separate gems or gem pieces maintained in opposition to each other to form a single composite whole. The precious or semi-precious minerals of which gem stones are composed, are substances which, aside from color, have chemical and physical properties that impart characteristic beauty and brilliancy to the gems made from them. A high index of refraction, for example, imparts brilliance. High dispersive powers gives "fire". Hardness is responsible for imperviousness to wear, scratching and other contacts. Transparency, crystal form, striations, characteristic flaws and other markings constitute other properties by which the genuine gems are recognized and upon which much of their value depends. In addition the characteristic of color is of prime importance in relation to value.

Production of gems having the chemical and physical properties of precious and semi-precious minerals, has been attempted synthetically by fusion. Color, in such cases, is imparted by a substance that becomes substantially uniformly distributed throughout during the fusion. Efforts in this direction have in some cases been moderately successful, but in general, it may be said the high temperatures required for fusion make the method of manufacture difficult, expensive and of limited utility and unfavorably affects the structure of the material itself. In short though the finished product may have the desired color it lacks other properties of the mineral to be reproduced and is therefore unsatisfactory in result as well as uneconomical in manufacture.

In the field of composite gems single large gems have heretofore been produced by putting together a plurality of smaller gems having substantially the color and other properties of the mineral to be reproduced, single large stones being regarded as of peculiar value. A diamond cluster is an example of this art.

In addition cheap ornaments have been made by putting together pieces of glass, crystal and the like by means of a colored cement but in these cases if the desired color was obtained there was lacking the brilliance, fire and structural characteristics of the genuine precious mineral sought to be reproduced.

Among the precious and semi-precious stones, gems are frequently regarded of peculiar value on account of their particular color alone. And among certain species of minerals common varieties exist that only lack a particular color to be of such value as to be classed as precious stones. Special circumstances may also cause a gem of a particular color to be desirable, as where gems are being matched or blended with other gems, or with the garments of the wearer, the setting, etc. It is the purpose of my invention to enable gems or gem substances to be colored as may be desirable without the expense and difficulty of fusion and with all the resulting "fire," brilliance, and appearance of precious stones.

Composite gems resembling in every important respect the precious colored minerals referred to are made by combining two or more pieces of the same species of mineral but deficient in color and imparting the desired color to the gem stone by positioning an appropriate coloring means at any or all of the interfaces within the composite gem. A gem so produced has the beauty and brilliancy of the original gem substance and, in addition, the beauty of the color that has been imparted to it by the coloring means used. When a composite gem so constructed is cut with several exterior plane surfaces at various angles and with a coloring means at interior interfaces, light is reflected and refracted from the many surfaces both within and without the gem and, by transmission through and reflection from the coloring means, gives the composite gem substantially the appearance of being colored uniformly throughout. Composite gems that are cut and shaped in usual patterns give desirable results.

My invention is of particular advantage in coloring gem substances which lack only color to be more precious as a gem. For example, a composite gem having the green coloration of the emerald and its brilliancy and other characteristics, may be made according to my invention from a variety of beryl having little or no color and which is relatively of little value.

There are several varieties of beryl. Beryl includes the emerald, the aquamarine, other varieties known as "precious beryl," and certain coarse varieties unfit for gem stones. Its color may be blue, green, yellow, brown, or rarely pink. The color, except in case of the emerald, is usually pale; and in some cases the mineral is colorless. It is characteristic of all transparent crystals of the beryl species that they are pleochroic. As all varieties of beryl are composed of substantially the same gem substance, the properties of all varieties, including the emerald, such as index of refraction, dispersion, and hardness, are practically identical. All the varieties of beryl, including the emerald, in practically all cases, are striated vertically and have certain characteristic cracks or flaws. This fact is significant, for not only will a composite gem made according to my invention have the brilliance and imparted color of the emerald, but it will have the characteristic striations, cracks, and flaws as well. These peculiarities of texture may be best preserved in the finished composite gem by employing sections or pieces that have been cut from a single piece of beryl and placing them together again by means of a suitable colored cement so that they will bear substantially the same physical relation to each other that they did prior to cutting. It is also significant that the composite gem will be pleochroic in the same manner as a genuine emerald.

A composite gem in the form of a doublet, colored similarly to an emerald, may be made from a pale variety of beryl in the following manner which I shall describe merely by way of illustration. A piece of beryl is selected, a colorless or pale blue variety being preferable, though pale yellow varieties would be nearly as satisfactory. It is roughly blocked out in the usual manner of the lapidary and then cut in two, a diamond saw being a suitable means. The sawed faces are planed off by suitable means such as a lead wheel with carborundum powder on its face. The faces are then polished, a tin wheel with French tripoli powder on its face being suitable. The two halves are then cemented together with an appropriate cement and coloring substance and cut, shaped and finished as desired.

The resulting stone has all the characteristics of a genuine emerald. Its hardness, "fire," brilliancy are the same. It has the same specific gravity, the same characteristic flaws and striations. It has the characteristic emerald color diffused through it by refraction and is pleochroic and responds to the emerald glass test of giving a transmitted wine colored light exactly as in the case of a genuine emerald. It differs only in being made in two or more parts so that before being mounted the thin line of juncture can be detected at the periphery.

Important features of my invention are that the cement used at the interfaces shall be of a character to withstand the conditions of manufacture and use and that when combined with the selected coloring material and applied at the interfaces of the composite gem, it will impart desired optical characteristics.

In mounting a gem in a metal setting, shellac is ordinarily employed which is subsequently removed by the "jeweler's bath," which is a mild solution of ammonia at boiling temperature. Thus a suitable cement should preferably be not only waterproof but resistant to a mild solution of boiling ammonia, or more generally, of weak alkali. The cement should also be resistant to the heat normally produced in cutting, grinding, and polishing a gem and preferably also that encountered when a gem is soldered in place in a setting. A suitable cement should have a melting point that is sufficiently high to prevent it from becoming fluid in boiling water and sufficiently low to permit the cement to soften to a gummy consistency at a temperature which will be convenient to work at, where the cement is applied in a fused condition. A cement that becomes plastic at about the temperature of boiling water is preferable.

The coloring means selected should be of sufficiently intense color to give the gum as a whole the desired color, and, as the amount of substance which can be placed at the interfaces of a composite gem is small, the color must be intense especially where a gem of deep shade is desired. If a gem is to be transparent, the coloring means must be transparent. Where a substance is used that is insoluble in a cement and a transparent and clear gem is desired, the index of refraction of the substance should be that of the cement. A substance that forms a clear and transparent solution with the cement is preferable, however.

The optical characteristics and particularly the transparency and index of refraction of the thin layer of colored cementitious material at the interfaces should approximate those of the gem substance in connection with which it is used so that the plane of juncture will not be noticeable.

I have found that gum dammar is a suitable cementitious material for making composite gems from beryl according to my invention. Gum dammar is insoluble in boiling water, satisfactorily withstands the action of the ammonia of a jeweler's bath and heat, and is workable at the temperature of boiling water, its melting point being approximately 120° C. Its index of refraction corresponds to that of beryl, which is 1.570–1.589.

While gum dammar is thus mentioned specifically, it is to be understood that other fossiliferous resins or mixtures thereof may be used and that gum dammar is mentioned merely as a preferred cement for beryl or mineral having a similar index of refraction. Other cementitious materials may be employed which have (1) substantially the optical characteristics of the gem to be reproduced and particularly as to transparency and index of refraction, (2) the physical characteristics of a melting point somewhat above 100° C., resistance to weak alkali and to the heat ordinarily encountered in finishing and setting jewelry and it should preferably be a solvent of the coloring matter used. Fossiliferous resins may be used individually or mixed with other resinous substances in order to secure a cement having the desired physical properties. Thus, for example, a cement having a desired index of refraction or melting point may be made by mixing two or more fossiliferous resins together that in themselves would be unsuitable. A cement may be employed in dry fusion or by dissolving it in a suitable solvent. When a cement is to be applied in a fused or partially fused condition, and a solvent has been used, it is preferable to expel substantially all of the solvent prior to cementing together the interfaces of the gem.

To impart the green color of an emerald to a composite gem made from a pale variety of beryl cemented together, I have found that a colored cement composed of gum dammar, brilliant yellow metanil and brilliant green aniline, mixed together in proper proportions may be used. Brilliant green is a basic organic dye of intense coloring power. Metanil yellow is an organic dye, not a basic dye, that is bright and imparts a proper yellow cast to the brilliant green. Both are soluble in gum dammar. Other coloring means than the preferred substances mentioned can, of course, be used that are sufficiently intense and transparent, when used in connection with a cement, to produce the desired green color.

In general the use of basic organic dyes is preferable. As the basic dyes are of intense color and form clear solutions in resins, they are particularly desirable, though other organic dyes such as metanil yellow mentioned above will also answer the purpose.

Gum dammar may be mixed with brilliant green and metanil yellow and applied to the interfaces of a composite gem by dry fusion. This may be accomplished in the following way. A small amount of the gum is softened in a water bath and the dyes mixed into it thoroughly. I find that it is preferable to mix the ingredients in the following proportions:

60 parts gum dammar
1 part brilliant yellow metanil
1 part brilliant green aniline and to add the yellow first and then add the green color until by visual comparison the color compares satisfactory with that of a genuine emerald. A small amount of the colored cement, at approximately its melting point, is then applied, as with a glass rod, to a prepared surface of the stone, which has preferably been heated to a similar temperature. A corresponding surface which is to be maintained in opposition to the surface thus prepared, is preferably similarly heated and the two squeezed together. The stone is then reheated to melt the gum, carefully aligned, and allowed to cool. It is then ready to be cut, polished and finished. Doublets made from beryl can be produced which are barely distinguishable from a genuine emerald; they possess its beauty, brilliancy, "fire", and markings and a green that has the appearance of the green that dwells in the emerald. Moreover doublets thus produced when tested under an emerald testing glass appear to have a purplish red or wine color, thus responding to the test in the same manner as a genuine emerald. So far as I am aware no other artificial emerald responds to this strict test.

The method of dry fusion which I have mentioned I regard merely as a preferred method as other methods may be employed in connection with my invention. For example, cementitious substances and coloring materials may be dissolved in a suitable solvent prior to application.

While I have described my invention as applied in making from beryl composite gems that have the beauty, brilliancy and color of the emerald, I have endeavored to describe and desire it to be understood that numerous variations in materials and compounds may be used as indicated above without departing from my invention as defined in the appended claims.

What I claim as new and desire to secure by Letters Patent of the United States is:

1. A compound for use in making composite gems comprising a transparent solution of an organic dyestuff and resinous cement that is resistant to boiling water, to weak alkalies, and to heat normally generated in cutting and polishing a gem, and that has a melting point somewhat above 100° C., and an index of refraction substantially the same as that of the gem substance to be used in making such composite gem.

2. A composite gem having interfaces maintained in opposition to each other by cement having a melting point somewhat above 100° C. and comprising a mixture of resinous materials resistant to the alkali of a jeweler's bath at boiling temperature.

3. A composite gem having interfaces maintained in opposition to each other by a cement having a melting point somewhat above 100° C. and comprising fossiliferous resin.

4. A composite gem of mineral having an index of refractions ranging from 1.570 to 1.589 having interfaces maintained in opposition to each other by gum dammar.

5. A composite gem of mineral having an index of refraction ranging from 1.570 to 1.589 having interfaces maintained in opposition to each other by a cement comprising dyestuffs diffused in gum dammar.

6. A composite gem of beryl having interfaces maintained in opposition to each other by gum dammar.

7. A composite gem of beryl having interfaces maintained in opposition to each other by a cement having a melting point somewhat above 100° C. and comprising a mixture of resinous materials that is resistant to the alkali of a jeweler's bath at boiling temperature.

8. A composite gem composed of beryl having interfaces maintained in opposition to each other by a cement comprising brilliant green aniline and metanil yellow dissolved in gum dammar.

9. A composite gem of beryl having interfaces maintained in opposition to each other by a cement of approximately the following composition, 60 parts gum dammar; 1 part metanil yellow; 1 part brilliant green aniline.

10. A composite gem of beryl having interfaces maintained in opposition to each other by a cement having a melting point somewhat above 100° C. and comprising basic dyestuff diffused in fossiliferous resin.

11. A composite gem of beryl having interfaces maintained in opposition to each other by a cement having a melting point somewhat above 100° C. and comprising a basic dyestuff dissolved in gum dammar.

12. A composite gem of beryl having interfaces maintained in opposition to each other by a cement having a melting point somewhat above 100° C. and comprising a basic green dye and a yellow dye dissolved in gum dammar.

In testimony whereof, I have signed my name to this specification.

FERDINAND D'ESPOSITO.